United States Patent [19]

Holmes

[11] Patent Number: 4,973,490

[45] Date of Patent: Nov. 27, 1990

[54] METHOD OF PRODUCING ANIMAL FEED PRODUCTS

[75] Inventor: William B. Holmes, King's Lynn, United Kingdom

[73] Assignee: Favor Parker Limited, Norfolk, United Kingdom

[21] Appl. No.: 375,663

[22] Filed: Jul. 5, 1989

[51] Int. Cl.$^5$ ............................................. A23K 1/211
[52] U.S. Cl. .................................. 426/630; 426/520; 426/807
[58] Field of Search ............... 426/629, 417, 656, 807, 426/630, 520

[56] References Cited

U.S. PATENT DOCUMENTS

| | | | |
|---|---|---|---|
| 3,695,891 | 10/1972 | Fox. | |
| 4,075,361 | 2/1978 | Oberg | 426/629 |
| 4,083,836 | 4/1978 | Anjou et al. | 426/417 |
| 4,158,656 | 6/1979 | Jones et al. | 426/656 |
| 4,244,973 | 1/1981 | Van Megen | 426/629 |

FOREIGN PATENT DOCUMENTS

| | | |
|---|---|---|
| 0231825 | 8/1987 | European Pat. Off. . |
| 3305984 | 5/1984 | Fed. Rep. of Germany . |
| 2598062 | 11/1987 | France . |
| 1310145 | 3/1973 | United Kingdom . |

OTHER PUBLICATIONS

Journal of the Science of Food and Agriculture, vol. 37, No. 8 Aug. 1986, pp. 735–741.
Journal of the Science of Food and Agriculture, vol. 37, No. 2, Feb. 1986, pp. 136–140.

Primary Examiner—R. B. Penland
Attorney, Agent, or Firm—Oliff & Berridge

[57] ABSTRACT

This invention relates to a method of producing animal feed products.

A method of producing animal feed products using rapeseed is described wherein rapeseed is mixed together with the species Vicia Faba (field beans) in predetermined proportions and the mix is extruded at a predetermined temperature to substantially inactivate components in the rapeseed and said species which otherwise directly or indirectly cause components in the extruded product which are detrimental when contained in an animal feed product.

11 Claims, No Drawings

METHOD OF PRODUCING ANIMAL FEED PRODUCTS

BACKGROUND OF THE INVENTION

This invention relates to a method of producing animal feed products.

DESCRIPTION OF THE PRIOR ART

Rapeseed (Brassica Napus or Brassica Campestris) is comparatively easily grown in the temperate climates of Northern Europe. At the same time, Common Market subsidies are promoting an increase in the quantity of rapeseed grown. Considerable development work into rapeseed has also been carried out in order to produce a quality of oil from the rapeseed which is ideal for human consumption, for example the oil can be used in margarine manufacture. Modern varieties of rapeseed known generally as single zero varieties have been developed towards the quality of the oil. Such a rapeseed contains typically approximately 40% oil and 22% crude protein. The single zero varieties unfortunately contain high levels of glucosinolates, typically in excess of 35 micromoles per gram, the presence of which makes the rapeseed unsuitable for direct animal feeding, apart from very small quantities to cattle.

In order to produce rapeseed that has greater potential for subsequent use, extensive development work has taken place in Canada leading to the development of the varieties known as "00" which have both a high quality of oil and a much lower level of detrimental glucosinolates (less than 35 micromoles per gram). These so called "00" varieties are being particularly encouraged by Common Market subsidy.

It is known that a number of basic raw materials which are used in animal feeds can be fed directly to animals rather than being parts of complex or balanced feed recipes, in particular poultry and pigs. For example, cereals such as barley and wheat, or peas can be fed directly to the aforementioned animals. Since rapeseed is rich in lipid and protein it would be very useful to employ rapeseed as a raw material in feeds for farm livestock, particularly monogastric animals. However even with the improved variety of rapeseed "00" mentioned above, the use of rapeseed is still limited by the presence of anti-nutritional factors, notably glucosinolates which can be hydrolysed to yield goitrogenic and other toxic factors. At the same time the high level of oil in the rapeseed can present considerable difficulties for grinding or processing the seed through an animal feed mill to make the final feed product. The situation is further complicated in that few suppliers can guarantee a predetermined level of glucosinolates. It appears that climatic conditions, fertilizer treatment and harvesting time appear to affect the level of glucosinolate present in the seed.

Research has been reported in J.Sci Food Agric. 1986,37,136–140 wherein rapeseed is diluted with another of the aforementioned basic raw materials which can be fed directly to the animals, in this case barley. The document discloses a process wherein the rapeseed and barley are extruded. During the extrusion process, the mix is subjected to high temperature, mechanical disruption and superheated steam generated from the moisture present in the raw materials. The document concludes that extrusion processing of high glucosinolate materials might give a product which proves to be an acceptable supplement to livestock final feed products in which they contribute only part of the protein source. This could then reduce the overall costs of the animal production.

Another paper in J.Sci. Food Agric. 1986,37,735–741 describes the dry extrusion of mixtures of rapeseed and soya beans and the effects on anti-nutritional factors. This document concludes that it is unlikely that extrusion will play a significant role in rapeseed detoxification.

SUMMARY OF THE PRESENT INVENTION

It is an object of the present invention to provide a method of producing animal feed products using rapeseed which method employs a basic raw material for animal feedstock which cannot in itself be directly fed to livestock without further processing.

According to one aspect of the invention there is provided a method of producing animal feed products using rapeseed, the method including the steps of: mixing rapeseed together with one or more of the species selected from Vicia Faba, Lupinus Albus, Lupinus Luteus in predetermined proportions; and extruding the rapeseed and said species at a predetermined temperature to substantially inactivate components in the rapeseed and said species which otherwise directly or indirectly cause components in the extruded product which are detrimental when contained in an animal feed product.

Thus, by mixing rapeseed together with a species which is itself of limited or little value without some form of processing, the method of the present invention brings together and enhances arable products which were hitherto considered to have relatively little value in view of the intrinsic anti-nutritional factors contained therein. The method is particularly important in that the extrusion breaks down cellular material to a state where substantially all the nutrients become available for digestion, particularly oils. Also the controlled heating can destroy or reduce to insignificant proportions many of the antinutritional factors found in the rapeseed and said species, for example trypsin inhibitors in said species. Furthermore, by gelatinising starch the digestibility of the carbohydrates is improved. Moreover, it has been found that the growth rate/feed conversion efficiency of the extruded product when used in an animal feed is higher than its chemical composition and predicted biological value would indicate. A final advantage has been unexpectedly found in that the shelf life of the product of the method is quite long. It is considered that this probably stems from destroying many of the natural enzymes capable of causing spoilage in feeds or able to release further anti-nutrients, for example lipoxidase which breaks down fats, or myrosinase which breaks down glucosinolates into nitriles etc.

In a preferred embodiment of the invention, the mixture from said mixing step is fed directly to the extrusion step without grinding. This makes production of the final product simpler, although it will be appreciated that the mixture could be transported to an extruder plant located where the final product is required. At the same time, direct feeding prevents any action of the myrosinase in hydrolysing glucosinolate at the point of grinding and before the heat of extrusion.

Conveniently, the proportion of the rapeseed is in the range 30 to 50% by weight and the proportion of said species is 50 to 70% by weight, the total being 100%.

Naturally, the particular selection of proportions is dictated by the requirements of the final product.

The preferred ranges are for the proportion of rapeseed to be substantially 50% and the proportion of said species to be substantially 50%. This allows particularly convenient mixing of the components if only one species is employed.

In order to obtain good results from the method of the present invention, the temperature during said extrusion step is substantially 120 degrees centigrade. In this way all the aforementioned benefits come into play. Steam may be added during the extrusion step to obtain this or a higher temperature.

In a preferred embodiment of the present invention the species is selected to be Vicia Faba. These are more commonly known as field beans. The extrusion step cooks the starch present in the beans and the temperature is sufficient to cause reduction of any trypsin inhibitors present in the beans without prejudice to the protein content. Field beans are readily grown in the northern hemisphere for feeding to livestock, particularly cattle. Thus, they constitute an excellent source of protein and starch. By using beans in the present method, the beans themselves are significantly improved in nutritional value, the anti-nutritional factors are reduced and the digestibility if the starch is increased. Another unexpected advantage has been found with this species in that the flowability of the product both during production and afterwards is very good notwithstanding the oil content being 22%. Normally, this level of oil would be expected to block up spouts, hold up bins and cause problems in elevators in a mill due to the stickiness of the oil. However, the method produces a dry product since, it is believed, the field beans absorb the oil.

According to a further aspect of the present invention there is provided an animal feed for pigs or poultry including as a proportion of the feed up to 20% of the product produced by the aforementioned method. Preferably, the proportion is between 7.5 and 12.5%.

DETAILED DESCRIPTION OF THE PREFERRED EMBODIMENTS

It will be apparent that the apparatus for performing the present invention comprises an elongate tube receiving a worm or screw auger located therein. One end of the tube is closed except for an aperture through which the animal feed product is extruded. A feed hopper is located to supply the basic raw materials to the worm in the tube. As is known in the art, the design of the worm is selected to ensure that the materials entering the tube are both compressed and heated by means of friction and pressure as they pass along the tube. The design of the worm is selected so that the temperature of extrusion is approximately that mentioned above. At the same time, the worm is selected so as to be capable of processing and extruding combinations of rapeseed and species in the ranges mentioned above. The rapeseed and the other primary product can be fed into the tube of the dry extruder by known means, although preferably, each basic raw material has its own hopper and a variable speed screw is arranged to supply the material to the main hopper in the required proportions. Such feed means are well known in the art.

An analysis of a product of the present invention is given below wherein 50% rapeseed and 50% field beans were extruded together. Genuine "00" rapeseed was used.

| COMPOSITION | | |
|---|---|---|
| Crude protein | % | 23.00 |
| Oil | % | 22.00 |
| Crude Fibre | % | 8.00 |
| Starch | % | 19.60 |
| Calcium | % | 0.27 |
| Phosphorus | % | 0.60 |
| Ash | % | 4.50 |
| Lysine | % | 1.43 |
| Methionine | % | 0.31 |
| Methionine + Cystine | % | 0.75 |
| Moisture | % | 8.50 |
| ENERGY ESTIMATES | | | |
| T.M.E.(N) | Poultry | M.J./Kg | 15.42 |
| D.E. | Pigs | M.J./Kg | 17.80 |
| M.E. | Ruminants | M.J./Kg | 16.00 | where T.M.E.(N) represents True Metabolisable Energy corrected for endogenous nitrogen. D.E. represents the digestible energy, a term usually applied to the available energy in feed for pigs, i.e. the apparent digestible energy of a food being the gross energy as determined by bomb calorimetry less the energy contained in the feces which results from any particular input of food. M.E. represents the metabolizable energy, a term usually applied to the available energy and feeds for ruminants, i.e. the metabolizable energy of a food is the digestible energy less the energy lost in the urine and combustible gases from the ruminant. The total level of glucosinolates is approximately 10 micromoles per gram. The level of mirosinase is extremely small if occurring at all. The level of breakdown products from the glucosinolates i.e. nitriles, isothiocyanates and goitrins is insignificant, indicating a complete inhibition of myrosinase and hence hydrolysis. As a level of 2 micromoles per gram is recommended as the maximum level for chicken diets, up to 20% of the extruded product can be employed in the final feed recipe. At the higher levels, a hard fat should be added to provide an extra fat source. A level of 12.5% is preferred in a recipe for fattening chickens whilst a level of 7.5% is preferred for turkeys. The product of the method of the present invention can be fed effectively in diets for pigs. As with other high fat raw materials, the feeding levels in this case should be adjusted to avoid the production of soft carcass fat.

The product of the method was fed to broiler chickens firstly as the sole component of the diet to assess its true metabolisable energy content (T.M.E.), that is to say the energy content which could be utilized by the chicken. The result was 15.42 M.J./Kg as an average of two tests.

The product was then fed to broiler chickens in a scientifically conducted trial as part of the diet assuming the energy content of the material was 15.42 M.J./Kg. The control diet without the material was of equal nutritional value based on energy, protein and the other known nutritional factors. Improvements in weight of the live birds at a given age were achieved from diets containing the product in some experiments, and in all experiments less food was consumed to give a given weight. Thus, a substantial saving in the cost of food was obtained. It can be seen therefore that there is a synergistic effect when the product is mixed with other materials to produce a final feed. In the present case, the components of the diet were wheat, soya bean, full fat soya bean, meat and bone meal, mixed feed fat, limestone, salt, dicalcium phosphate and vitamins plus trace minerals, methionine and choline chloride. The product replaced some wheat, soya bean meal and mixed fat keeping the nutritional levels equal.

The combination of beans and rapeseed under the conditions of the method resulted in a product which could be handled in a commercial feed mill without interruption in flow or "bridging" in storage bins. For a material containing 22% of oil this was an unexpected result. Materials of this oil level, for example poultry offal meal, normally create flow difficulties.

A final unexpected advantage of the product was found to be storage thereof. It is generally recommended that field beans should be used immediately after grinding and the increase in fatty acid level of crushed oil seeds is well acknowledged. Thus, it was expected that the product described above would have a lack of oil stability and hence a restricted shelf life.

However, it has been found that after extrusion, the oil was virtually stabilised and there was little increase in F.F.A. content. The following results of a test comparison of the product of the present invention with storage of white field beans and ground "00" rapeseed show that the product is stable over at least an 8 week period compared with a rapid increase in F.F.A. level for the beans and rapeseed.

|  | Beans | Rapeseed % FFA in oil | Lab Mix | Product |
|---|---|---|---|---|
| Start | 12.86 | 1.91 | 2.82 | 2.69 |
| 1 | 14.43 | 5.41 | 4.55 | 2.61 |
| 2 | 15.20 | 6.48 | 5.44 | 2.38 |
| 3 | 15.00 | 7.45 | 6.84 | 2.43 |
| 4 | 14.68 | 8.60 | 7.44 | 2.53 |
| 5 | 15.50 | 9.47 | 8.37 | 2.53 |
| 6 | 17.20 | 10.64 | 9.72 | 2.81 |
| 7 | 18.16 | 11.04 | 9.93 | 2.86 |
| 8 | 18.89 | 11.07 | 10.19 | 2.84 |

All samples were held at room temperature for 8 weeks with the free fatty acid level of the oil being checked at weekly intervals.

It will be apparent to a person skilled in the art that although specific parameters for the method are described herein, other ranges within the scope of the present invention can be employed. The present invention enables products of hitherto restricted suitability to be converted to a form which is easily handled, has improved nutritional value, and can be safely used by the increasingly important national poultry flock and pig herd.

What we claim is:

1. A method of producing animal feed products using rapeseed, the method comprising the steps of:
    mixing rapeseed together with one or more of a species selected from the group consisting of Vicia Faba, Lupinus Albus, and Lupinus Luteus in predetermined proportions; and
    extruding the rapeseed and said species at a predetermined temperature which is sufficient to substantially inactivate enzymes in the rapeseed and said species which, directly or indirectly, interfere with digestibility and shelf life of an animal feed product.

2. A method as claimed in claim 1 wherein the mixture from said mixing step is fed directly to the extrusion step without grinding.

3. A method as claimed in claim 2 wherein the proportion of the rapeseed is in the range 30 to 50% by weight and the proportion of said species is 50 to 70% by weight, the total being 100%.

4. A method as claimed in claim 3 wherein the proportion of rapeseed is substantially 50% and the proportion of said species is substantially 50%.

5. A method as claimed in claim 4 wherein the temperature during said extrusion step is substantially 120 degrees centigrade.

6. A method as claimed in claim 1 wherein steam is added at the extrusion step.

7. A method as claimed in claim 1 wherein the species is selected to be Vicia Faba.

8. An animal feed for pigs or poultry including as a proportion of the feed up to 20% of a product comprising rapeseed together with one or more of a species selected from the group consisting of Vicia Faba, Lupinus Albus, and Lupinus Luteus produced by mixing rapeseed together with one or more of the species selected from the group consisting of Vicia Faba, Lupinus Albus, and Lupinus Luteus in predetermined proportions; and
    extruding the rapeseed in said species at a predetermined temperature which is sufficient to substantially inactivate enzymes in the rapeseed and aid species which, directly or indirectly, interfere with digestibility and shelf life of an animal feed product.

9. An animal feed as claimed in claim 8 wherein said proportion is between 7.5 and 12.5%.

10. A method of producing animal feed products using rapeseed, the method comprising the steps of:
    mixing rapeseed together with one or more species selected from the group of species consisting of Vicia Faba, Lupinus Albus, and Lupinus Luteus;
    subjecting said rapeseed and said species to a temperature which is sufficient to substantially inactivate enzymes in the rapeseed and said species which, directly or indirectly, interfere with digestibility and shelf life of an animal feed product; and
    extruding said rapeseed and said species.

11. An animal feed product formed by a method comprising the steps of:
    mixing rapeseed together with one or more species selected from the group of species consisting of Vicia Faba, Lupinus Albus, and Lupinus Luteus;
    subjecting said rapeseed and said species to a temperature which is sufficient to substantially inactivate enzymes in the rapeseed and said species which, directly and indirectly, interfere with digestibility and shelf life of an animal feed product; and
    extruding said rapeseed and said species.

* * * * *